United States Patent
Camden et al.

(10) Patent No.: US 7,346,589 B1
(45) Date of Patent: Mar. 18, 2008

(54) STANDARDIZED METHOD FOR PRICING TREE SERVICES

(76) Inventors: Bradley T. Camden, 90 E. CR 1400 North, Atwood, IL (US) 61913; Gregory A. Durst, 802 E. High St., Urbana, IL (US) 61801

(*) Notice: Subject to any disclaimer, the term of this patent is extended or adjusted under 35 U.S.C. 154(b) by 408 days.

(21) Appl. No.: 10/427,625

(22) Filed: Apr. 30, 2003

Related U.S. Application Data

(60) Provisional application No. 60/376,579, filed on Apr. 30, 2002.

(51) Int. Cl.
*G06Q 99/00* (2006.01)

(52) U.S. Cl. .............. 705/400; 705/1; 705/7; 705/10; 705/37

(58) Field of Classification Search .......... 705/7, 705/36, 400, 37, 10, 1; 144/176
See application file for complete search history.

(56) References Cited

U.S. PATENT DOCUMENTS

| | | | |
|---|---|---|---|
| 5,793,632 A * | 8/1998 | Fad et al. | 705/400 |
| 6,216,108 B1 * | 4/2001 | LeVander | 705/7 |
| 6,338,027 B1 * | 1/2002 | Fulton | 702/127 |
| 7,003,487 B1 * | 2/2006 | Skirpa | 705/37 |
| 7,062,450 B2 * | 6/2006 | Kobayashi et al. | 705/10 |
| 2002/0138289 A1 * | 9/2002 | Thielges et al. | 705/1 |

FOREIGN PATENT DOCUMENTS

JP     11288437 A * 10/1999

OTHER PUBLICATIONS

Acrtinc.com.*
Turftree.com.*
Metzger, Susan R., "How to Hire and Arborist", Mar. 20, 2001, Ohio State University Fact Sheet.*
Treequote.com.*

* cited by examiner

*Primary Examiner*—John W. Hayes
*Assistant Examiner*—Freda A. Nelson
(74) *Attorney, Agent, or Firm*—Pioneer Patent LLC; Shannon Nebolsky

(57) ABSTRACT

The present invention is methods, system and apparatus for the pricing tree services. The invention determines prices for tree, limb, and debris removal and trimming, taking into account factors such as difficulty of cutting and removal, prevailing costs, and the density of the tree, limbs or debris.

18 Claims, 1 Drawing Sheet

STANDARDIZED METHOD FOR PRICING TREE SERVICES

BACKGROUND OF THE INVENTION

At the time of the present invention, people providing tree services, and people evaluating the cost of providing tree services, were able to rely only on experience in the industry to determine what a price for tree services should be.

Underwriters providing damage insurance had no standardized method or apparatus or software to evaluate the prices that they should offer to cover for tree services. In other areas of underwriting, such as automobile insurance, several tools had been developed to determine and evaluate damage and work estimates that contributed to consistency.

The present invention provides a comprehensive, standardized method, apparatus and device for the determination of prices for tree services.

BRIEF DESCRIPTION OF THE INVENTION

The present invention contemplates methods, system and apparatus for the pricing tree services. The invention determines prices for tree, limb, and debris removal and trimming, taking into account factors such as difficulty of cutting and removal, prevailing costs, and the density of the tree, limbs or debris.

A contemplated method for determining a price for tree services includes but is not limited to the steps as follows, not necessarily in any particular order. A tree service price request is received wherein said tree service price request includes data to calculate trunk mass, adjusted canopy mass, difficulty factor data, disposal data, rental data, limb measurement data, pile volume data, pile compression data, and other additional fee information. An adjusted base cost is calculated from the trunk mass data, adjusted canopy mass data, limb measurement data, pile volume data, pile compression data, canopy density factors, cost per trunk mass unit, cost per canopy mass unit, vegetation factor, and pile compression factor. A cumulative difficulty factor is calculated from the difficulty factor data, the accessibility factors, obstacle factors, health factors, hazard factors, growth factors, weather factors, terrain factors, disaster factors, and felling cost factors. A final cost for tree services is calculated using the adjusted base cost, the cumulative difficulty factor, and disposal data, rental data and other additional fee information. The final cost for tree services is outputted for the tree service price request.

A contemplated apparatus for determining a price for tree services includes but is not limited to the following. A data receiving means for receiving a tree service price request wherein said tree service price request includes trunk mass data, adjusted canopy mass data, difficulty factor data, disposal data, rental data, limb measurement data, pile volume data, pile compression data, and other additional fee information. A database storage means for storing at least one of the canopy density factors, cost per trunk mass unit, cost per canopy mass unit, accessibility factors, obstacle factors, health factors, hazard factors, growth factors, weather factors, terrain factors, disaster factors, felling cost factors, disposal factors, rental factors, vegetation factor, pile compression factor, and other additional fee information. An adjusted base cost calculating means for calculating the adjusted base cost from the trunk mass data, adjusted canopy mass data, limb measurement data, pile volume data, pile compression data, canopy density factors, cost per trunk mass unit, cost per canopy mass unit, vegetation factor, and pile compression factor. A cumulative difficulty factor calculating means for calculating the cumulative difficulty factor from the difficulty factor data, the accessibility factors, obstacle factors, health factors, hazard factors, growth factors, weather factors, terrain factors, disaster factors, and felling cost factors. A final cost calculating means for calculating the final cost from the calculated adjusted base cost, the calculated cumulative difficulty factor, disposal data, disposal cost factors, rental data, rental factors, and other additional fee information. A tree service price output means for outputting the tree service final cost for tree services determined from the tree service price request.

A contemplated system for determining a price for tree services includes, but is not limited to, the following. A tree service price request input source for receiving a request for a price on tree services, the request comprising input data for at least one of height of tree trunk, radial measurement of the tree trunk, canopy mass and canopy density, difficulty factor data, disposal data, disposal data, rental data, limb measurement data, pile volume data, pile compression data, and other additional fee information. A tree service factor database containing at least one of the canopy density factors, cost per trunk mass unit, cost per canopy mass unit, accessibility factors, obstacle factors, health factors, hazard factors, growth factors, weather factors, terrain factors, disaster factors, felling cost factors, disposal factors, rental factors, vegetation factor, pile compression factor, and other additional fee information. A tree service price processor coupled to the tree service price request input source and the tree service factor database, said processor comprising means for calculating adjusted base cost, means for calculating cumulative difficulty factor, and means for calculating final cost to provide output data to make a serviced tree service price request. A tree service price output source, coupled to the tree service price processor, for outputting the serviced tree service price request.

DESCRIPTION OF THE DRAWINGS

In the drawing forming a part of this disclosure.

DETAILED DESCRIPTION OF THE INVENTION

Figure 1:
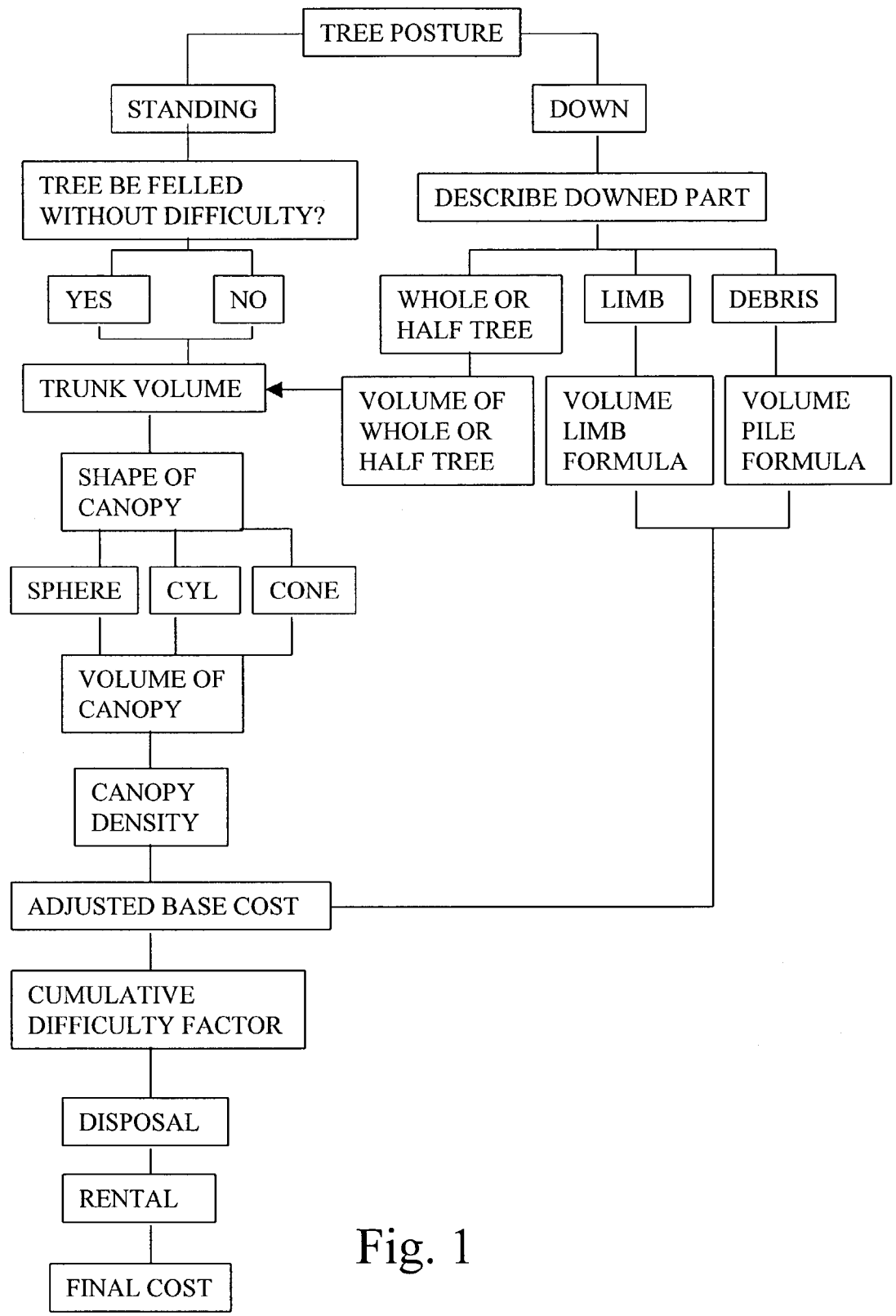
FIG. 1 shows a flow chart for an embodiment of the invention wherein the factors considered are interrelated as shown. The tree posture is determined to be either standing or down. If the three posture is down, the downed part is classified as a whole or half tree, a limb or limbs, or debris. If the downed part is debris, the pile formula is used to calculate the volume for removal, which is used with the cost per unit volume removal to determine the adjusted base cost. If the downed part is a limb or limbs, then the limb formula is used to calculate the volume for removal, which is used with the cost per unit volume removal to determine the adjusted base cost. If the downed part is a whole or half tree, then the trunk volume and shape of canopy information is used as with a standing tree to calculated the adjusted base cost. If the tree is standing, the difficulty in felling the tree is factored in together with the trunk and adjusted canopy volume, to determine the adjusted base cost. The canopy volume can be approximated as a sphere, cone or cylinder, with the appropriate density factor. Cumulative difficulty factors are considered together with the adjusted base cost, as are disposal and rental costs, in determining the final cost.

The present invention contemplates methods, system and apparatus for the pricing tree services. The invention determines prices for tree, limb, and debris removal and trimming, taking into account factors such as difficulty of cutting and removal, prevailing costs, and the density of the tree, limbs or debris.

A contemplated method for determining a price for tree services includes but is not limited to the steps as follows, not necessarily in any particular order. A tree service price request is received wherein said tree service price request includes data to calculate trunk mass, adjusted canopy mass, difficulty factor data, disposal data, rental data, limb measurement data, pile volume data, pile compression data, and other additional fee information. An adjusted base cost is calculated from the trunk mass data, adjusted canopy mass data, limb measurement data, pile volume data, pile compression data, canopy density factors, cost per trunk mass unit, cost per canopy mass unit, vegetation factor, and pile compression factor. A cumulative difficulty factor is calculated from the difficulty factor data, the accessibility factors, obstacle factors, health factors, hazard factors, growth factors, weather factors, terrain factors, disaster factors, and felling cost factors. A final cost for tree services is calculated using the adjusted base cost, the cumulative difficulty factor, and disposal data, rental data and other additional fee information. The final cost for tree services is outputted for the tree service price request.

A contemplated apparatus for determining a price for tree services includes but is not limited to the following. A data receiving means for receiving a tree service price request wherein said tree service price request includes trunk mass data, adjusted canopy mass data, difficulty factor data, disposal data, rental data, limb measurement data, pile volume data, pile compression data, and other additional fee information. A database storage means for storing at least one of the canopy density factors, cost per trunk mass unit, cost per canopy mass unit, accessibility factors, obstacle factors, health factors, hazard factors, growth factors, weather factors, terrain factors, disaster factors, felling cost factors, disposal factors, rental factors, vegetation factor, pile compression factor, and other additional fee information. An adjusted base cost calculating means for calculating the adjusted base cost from the trunk mass data, adjusted canopy mass data, limb measurement data, pile volume data, pile compression data, canopy density factors, cost per trunk mass unit, cost per canopy mass unit, vegetation factor, and pile compression factor. A cumulative difficulty factor calculating means for calculating the cumulative difficulty factor from the difficulty factor data, the accessibility factors, obstacle factors, health factors, hazard factors, growth factors, weather factors, terrain factors, disaster factors, and felling cost factors. A final cost calculating means for calculating the final cost from the calculated adjusted base cost, the calculated cumulative difficulty factor, disposal data, disposal cost factors, rental data, rental factors, and other additional fee information. A tree service price output means for outputting the tree service final cost for tree services determined from the tree service price request.

A contemplated system for determining a price for tree services includes, but is not limited to, the following. A tree service price request input source for receiving a request for a price on tree services, the request comprising input data for at least one of height of tree trunk, radial measurement of the tree trunk, canopy mass and canopy density, difficulty factor data, disposal data, disposal data, rental data, limb measurement data, pile volume data, pile compression data, and other additional fee information. A tree service factor database containing at least one of the canopy density factors, cost per trunk mass unit, cost per canopy mass unit, accessibility factors, obstacle factors, health factors, hazard factors, growth factors, weather factors, terrain factors, disaster factors, felling cost factors, disposal factors, rental factors, vegetation factor, pile compression factor, and other additional fee information. A tree service price processor coupled to the tree service price request input source and the tree service factor database, said processor comprising means for calculating adjusted base cost, means for calculating cumulative difficulty factor, and means for calculating final cost to provide output data to make a serviced tree service price request. A tree service price output source, coupled to the tree service price processor, for outputting the serviced tree service price request.

The present invention provides a method for determining a price estimate for tree trimming and removal. Using the method, a price is calculated with only a few variable inputs.

The present method is not intended to replace the conventional method for tree pricing, but offers an alternative to conventional quoting that could revolutionize the tree bidding process worldwide. Typically tree pricing varies from company to company depending on several factors, such as the way a company controls their expenses, their philosophical approach to doing business, and their desired profit margin. In all cases the customer must trust the price they are given is fair, or the "going rate", because of the lack of any standard to compare it to. The present standardized method for pricing tree services could be the comparison model that, when used properly, can offer a pricing standard to eliminate over-pricing of tree work and legitimize a company's bidding process.

The exemplary prices below are for the American Midwest in 2002. In a preferred embodiment, there is also a provision in the program for calculating different price quotes depending on the prevailing labor wages for the region in which the work is being carried out, for example in the United States of America.

Many of the examples discussed below were worked out using an embodiment of the invention that is a tree price calculator program called TREE QUOTE.

Base Cost

The first step in this process is to generate a base cost. The base cost is the Adjusted Canopy Mass multiplied by the canopy cost per unit volume plus the Trunk Mass multiplied by the trunk cost per unit volume; in the following Example, the unit volume is cubic yard. Its is understood that the unit volume can be any unit of measurement, preferably consistent measurement systems for the various measurements, most preferably the standard English or metric systems.

Trunk Mass=Cubic Yards Tree Trunk(2)

Canopy Mass=Cubic Yards Canopy(1000)

In the Example above there are numbers in parenthesis beside the cubic yards of the tree trunk and the cubic yards of the canopy. These are merely exemplary numbers to calculate an example of a result of the Base Cost shown later. The trend of having exemplary numbers is used throughout this specification in the various formulas in order to provide an Example for every aspect of the contemplated invention.

The Unit Volume, or in this case, Cubic Yards of the Tree Trunk or Trunk Mass is found by measuring the tree trunk from the ground up to the bottom of the canopy and calculating the cubic yards of the tree trunk as approximated by a Cylinder, or in some cases, irregular cylinder. A radial measurement of the tree trunk can be either radius, diameter or circumference, all being straightforward to convert to each other and used to calculate the trunk mass.

The cost per tree trunk volume, referred to herein as cost per trunk mass unit, is preferably part of a tree price calculator database that can be altered as needed to reflect current or regional costs. The Cost per cubic yard of a tree trunk in the American Midwest in 2002 from $60.00 to $70.00, typically $65.00.

The Canopy Volume or Cubic Yards of the Canopy or Canopy Mass is found by outlining the canopy and then calculating the cubic yards of the canopy as approximated by a Sphere. In some cases the canopy will not resemble a sphere and may look more like a Cone, or in rare cases may even resemble a cylinder. In this case an approximate volume is preferably determined by calculating the unit volume or cubic yards of the cone or cylinder instead. The formulas for determining the volume of a sphere, cone, or cylinder are well-known.

Now that the Canopy Mass has been calculated, density, selected from the canopy density table, is multiplied to the canopy mass, reducing the canopy volume, resulting in ADJUSTED CANOPY MASS.

The following is a table providing guidance for reduction of the canopy volume based on the density of the canopy.

Canopy Density

If the canopy is sparse reduce the volume of the canopy by 90 to 97%, preferably 95%

If the canopy is thin reduce the volume of the canopy by 80 to 90%, preferably 85%

If the canopy is mediocre reduce the volume of the canopy by 70 to 80%, preferably 75%

If the canopy is full reduce the volume of the canopy by 60 to 70%, preferably 65%

If the canopy is very full reduce the volume of the canopy by reduce the volume of the canopy by 50 to 60%, preferably 55%

For this Example, assume the canopy is full. Therefore 65% will be reduced from the volume of the canopy.

After reducing 65% from the Canopy Mass, the Adjusted Canopy Mass is 350.

$$\text{Canopy Mass}(1000) * \text{Canopy Density}(0.65) = 350$$

In a contemplated embodiment of the present invention, the measurements are subjected to scaling factors or portions of the volume formula are applied directly before the data is input. For example, in one embodiment, when entering in measurements for Cones, when the TREE QUOTE program asks for the trunk height, one half of the total height of the tree is entered in this field.

The base cost can now be determined. The base cost is the Adjusted Canopy Mass multiplied by the canopy cost per unit volume plus the Trunk Mass multiplied by the trunk cost per unit volume. In the present example, we use a cost per cubic yard to calculate the Base Cost. The Cost per Canopy Mass Unit, which is the canopy removal Cost Per Unit Volume, such as the canopy cost per Cubic Yard is a market set number. In a preferred embodiment, the Cost Per Cubic Yard is determined by a sliding scale, and is a variable part of the system that can be set and changed as need to reflect market conditions. The cost per cubic yard for canopies is typically between $1.00 and $3.50 using 2002 prices for the American Midwest (price adjustments for the time value of money and/or inflation or different currency is contemplated according to commonly-accepted accounting principles), depending on the Bulk Factor of the canopy. The bulk factor is a measure of how much bulk wood is in the canopy. The Bulk Factor ranges from light to heavy.

$$\text{Adjusted Base Cost} = \text{Adjusted Canopy Mass}(350) * \text{Canopy Cost Per Cubic Yard}(2) + \text{Trunk Mass}(2) * \text{Trunk Cost Per Cubic Yard}(65) = \$830$$

Difficulty Factors

The Adjusted Base Cost provides a solid foundation upon which to work. There are other factors that do affect the cost of the tree. Difficulty Factors, such as where a tree is located, whether or not the tree is lying on a house, and other factors listed below can alter the final cost, making it different from the base cost. All difficulty factors are added together to achieve a Cumulative Difficulty Factor (CDF). The costs associated with the CDF are added onto the base cost as part of the calculation of a Final Cost.

For these factors, the percentage of the base cost shown below is added to the base cost. Thus, if 20% of the base cost is added to the base cost because the tree(s) to be removed is only marginally accessible, then the contribution to the final cost due to accessibility is (base cost) times (20%), resulting in a Final Cost (if there are no other factors, and thus the CDF is 20%) which is (base cost) times (120%).

ACCESSIBILITY—How accessible is this tree with your equipment? Can you get your equipment right next to the tree?

1. Full—I can get all of my equipment right next to the tree. Add 0%.

Good—I can get most of my equipment next to the tree. Add 7.5-22.5%, preferably 15%.

3. Moderate—I can get about half of my equipment next to the tree. Add 22.5-37.5%, preferably 30%.

Minimal—I can only get a minimal amount of equipment next to the tree. Add 37.5-52.5%, preferably 45%.

Zero—I cannot get any of my equipment next to the tree, or there are major obstacles in the way. For example, your equipment can be up to 50 yards away from the tree for this classification. Add 52.5-67.5%, preferably 60%.

For every additional 10 feet over 30 feet you are from the tree, add an extra 3-5% (preferably 4%) to the Zero classification.

OBSTACLES—Where is this tree situated in relation to the environs? Is the tree in an open area, or is the tree perched over a house, or other structures? Can the tree be brought down quickly without worry of tearing up property structures or landscaping, or must the tree be pieced out carefully and brought down less efficiently?

None—The tree is completely in the open with no structures under the tree and can be brought down quickly without fear of property damage. Add 0%

Minor—There is a minor amount of obstacles. Add 7.5-22.5%, preferably 15%

Marginal—The tree cannot be brought down quickly and freely without some concern of property damage. Add 22.5-37.5%, preferably 30%

Major—Major consideration must be given to the property structures in and around the tree which will require the tree to be brought down slowly. Add 37.5-52.5%, preferably 45%

Extreme—Tree is surrounded by obstacles. Add 52.5-67.5%, preferably 60%

HEALTH—Is the tree dying or dead?

Live—The tree is alive. Add 0%

Half Dead—The tree is at or near half dead. Add 10-20%, preferably 15%

All Dead—The tree is at or near all dead. Add 20-30%, preferably 25%

HAZARD—Is the tree or part of the tree lying on a structure such as a house, a car, or utility lines? These numbers are plus or minus 5% but preferably that listed.

No Hazard—If pricing a standing tree Add 0% If pricing a downed tree or limb Deduct 20%.

Walkable Structure—The tree is lying on a walkable structure. Add 15%.

Unwalkable Structure—The tree is lying on a structure that is unwalkable (for example a roof pitch is 5/12 or greater). Add 40%

On Vehicle—The tree is lying on a vehicle. Add 15%.

In Utility Lines—The tree is lying in utility lines. Add 15%.

Other—Hazards not listed above that the tree is lying on, Add 15%.

If walkable or unwalkable structure is selected from the hazard menu, you will have to enter the following:

Working Height: How high up the structure is you are working on.

1 Story—A 1 story structure. Add 0%

2-3 Story—A 2-3 story structure. Add 10%

4 Stories and above—A structure 4 stories or more. Add 20%

GROWTH—Is there additional growth on the tree other than limbs or leaves? There should be a considerable amount of additional growth before this factor comes into play. The fruit should be measured in bushels, or there should be more than a few thorns before adding this factor. These number are plus or minus 5%

Thorns—There is thorny growth on the tree Add 25%.

Fruit—The tree is bearing fruit. Add 15%.

Vines—There is vine growth in the tree. Add 10%. Additional modification may be required if the vine is an allergenic plant, such as poison ivy.

WEATHER—Weather effects that can make it harder to perform tree work. This factor is only applicable when demands are put upon the contractor to work in these conditions. These numbers are plus or minus 5%, but preferably that listed.

Snow[1]—Snow accumulations over 2". Add 25%.

[1] This snow level of weather condition can also be met by working in aquatic environments. Some of these environments include, but are not limited to, lakes, rivers, streams, oceans, swamps, or swimming pools.

Ice—accumulations of ice on ground or tree. Add 25%.

Terrain—Uneven or unstable ground or steep grades that can cause difficulty doing a tree job. These numbers are plus or minus about 10%, but the preferable number for the Terrain factor is the percentage listed in the table below.

Grade 1—Hilly or mountainous grades that are between 20 and 30 degrees. Add 20%.

Grade 2—Grades between 31 and 45 degrees. Add 60%.

Grade 3—Grades over 45 degrees. Add 100%.

Unstable—The ground around the tree is rocky[2] or muddy[3]. Add 20%.

[2] An unstable ground around the tree classified here as rocky means for example that there are rocky protrusions from the ground greater than 3 inches in height.

[3] An unstable ground condition is considered muddy if there are muddy, muck, or bog conditions greater than 3 inches in depth.

DISASTER—Has the area been declared a State or National disaster area?

If yes, Add 15-25 and preferably 20%

Felling Cost—The ease with which a standing tree can be felled. If there is not a clear path to safely fell the tree or if rigging equipment must be used to assist in the fall, then a hard felling cost will always be selected. If the tree is in an open field or there is a clear drop path and there is good lean weight that way, then an easy fell can be selected.

Hard Fell—Add 0-10% preferably 5%.

Easy Fell—Subtract 10-20%, preferably 15%

This is referred to in the formula as plus or minus (+/−), but is understood that it is the addition or subtraction described above.

For our Example we will assume that the tree can not be felled easily.

All of the difficulty factors have now been considered. The cumulative difficulty factor can now be determined. In the following example, the Cumulative Difficulty factor is calculated. The Cumulative Difficulty Factor is the sum of all of the Difficulty factors discussed above. When a particular difficulty factor does not come into play, the addition to the CDF from that factor is 0%. In some embodiments of the present invention, the un-used factors are added in as 0%, and in other embodiments, the un-used factors are left out of the equation.

Cumulative Difficulty Factor(CDF)=Accessibility (40)+Situation(0)+Health(0)+

Hazard(30)+Additional Growth(0)+Weather(0)+Terrain(60)+Disaster(0)+/−Felling cost(5)

By looking at the example numbers in the cumulative difficulty factor above, the only difficulty factors that come into play are Accessibility, Hazard, Terrain, and Felling Cost. In this Example, we have zero accessibility, an unwalkable hazard, and grade 2 terrain. All of these are now added together to arrive at the Cumulative Difficulty Factor.

Accessibility(zero)+Hazard(on unwalkable)+Terrain (grade 2)+Felling Cost(hard fell)

40%+30%+60%+5%=135%(1.35)

So, in this example the Cumulative Difficulty Factor is 135%, or when converted to decimal it is 1.35.

Please note that due to the commutative properties of multiplication and addition, respectively, an alternative embodiment does not first total the factors listed above to arrive at a CDF and then multiply that CDF by the base cost, but rather will first multiply the base cost by each of the individual factors and then make the sum of the individual (base cost)(factor) products.

In other words, the additional cost due to difficulty factors is (base cost) times (cumulative difficulty factor), or equivalently, the additional cost due to difficulty factors is the sum of the (base cost) times (each individual difficulty factor).

There are now only two more factors to figure before the Final Cost is determined.

DISPOSAL—What happens to the tree debris after it is on the ground? This ranges from a large discount if all of the debris stays on site to no discount if everything is to be hauled away.

In a preferred embodiment, the default is to haul everything, so the default is to have 100% disposal factor. If the full service treatment is not desired, then a percentage of the disposal cost is deducted. The preferred percentages deducted are as listed below, but the invention contemplates variation in these adjustments by plus or minus 5%.

Haul Everything—Remove all tree debris from site Deduct 0%

Haul all but Firewood—Remove canopy and large bulk, leave firewood size bulk in cut pieces on site. Deduct 10%

Haul Canopy—Remove canopy, leave bulk Deduct 15%

Haul Bulk—Remove bulk, leave canopy Deduct 20%

Make Piles—Make piles around tree and go Deduct 25%

Drop and Go—Drop the tree and go. Deduct 35%

In a preferred embodiment, the disposal factor is converted before we plug it into the Final Cost formula. It is preferably done by subtracting the disposal factor from 100 and then dividing this number by 100. In the following Example, the tree disposal requested is a Drop and Go. Looking above we can see the disposal factor for this is 35%. By plugging this number into the disposal formula the result is 0.65.

Disposal=(100−Disposal Factor)/100

(100−35)/100=0.65

The disposal factor multiplied by the base cost is the contribution to the final cost for the tree cutting and disposal. In other words, in a preferred embodiment, the base cost with the above-discussed Cost per Cubic Yard is for Haul Everything.

In an alternative embodiment of the present invention, the Cost per Cubic Yard is for "Drop and Go", and then from 0% to about 35% (plus or minus 10%) is the factor added onto the Base Cost.

RENTAL—Is there equipment needed to complete a tree job that is not considered part of a Tree Company's Normal Equipment Repertoire[4]? This cost is essentially a pass-through cost, preferably with a small mark-up such as 10-20% of the equipment rental cost, preferably about 15%. This amount adds onto the tree services calculated from the base cost and difficulty factors and disposal factor.

[4] Normal equipment for an Arborist are ropes and tackle, safety belts and tethers, climbing spikes, hand saws, power saws, shears, axes, wedges, ladders, bucket truck, chipper, tractor, grapple loader, flatbed semi, chipper box, carts, rakes, shovels, brooms, and power blowers.

If Yes, Add Rental Fee, preferably adding 15%

A rental factor is either the rental fee, the rental fee percent multiplier, or the rental fee including the percent multiplier.

For use in our example, we assume no additional equipment is needed.

We now have all the data we need to calculate a Final Cost, according to the following equation.

Final Cost=(Base Cost*Disposal)+(Base Cost*CDF)+Rental

Wherein the base cost is the adjusted base cost described above if the base cost needed adjusting, for example as a result of the canopy mass. Then the final cost is the adjusted base cost times (disposal plus cumulative difficulty factor) plus the additional cost of rental.

In this Example of a calculation of Final Cost, the CDF is 135%, the Base Cost is $830 as in the examples hereinabove (zero accessibility, unwalkable and grade 2 terrain), and the Disposal is Drop and Go, and no equipment rental was needed.

Final Cost=(Base Cost*Disposal)+(Base Cost*CDF)+Rental (830*0.65)+(830*1.35)+0=$1660

The present invention contemplates carrying out the above-listed calculation steps as needed, or carrying out all steps with a default multiplier of zero for factors not under consideration in determining the Final Cost.

Branches and Limbs

In addition to pricing out trees, the present invention also provides methods and apparatus for quoting for downed trees, piles, and limbs.

Formulas for Limbs and Piles

Limb:Limb length*Limb width*Vegetation Factor*Cost per unit measure    A.

The Vegetation Factor is a variable that determines the density of the limb, which is similar to density of the canopy as discussed above. It typically ranges between 0.4 and 1.5, 0.4 being a light vegetation factor.

The cost per unit measure for limbs in American Midwest in 2002 is between 18 and 24 cents.

The base price for trimming limbs increases by 1% per foot above 20 feet above ground level.

B. Pile: Volume formula recommended for use in calculating piles is that for a rectangular prism.

The adjusted base cost for pile removal

Pile Volume*Pile Compression Factor*Cost per unit measure.

The cost per unit measure is in this Example cubic yard.

Pile Compression factor comes from the variable that determines how packed a pile is. The pile compression data ranges from loose to tight. The resulting pile compression factor then typically ranges from 0.35 to 1.5, with 0.35 being a loosely packed pile.

The cost per unit measure for piles in the American Midwest in 2002 is between $1.25 and $1.75.

Tree trimming quotes can also be made with the methods and calculator program of the present invention. This is achieved by pricing each limb using the limb formula, provided above, and then adding them all together for a tree trimming quote.

Other Additional Fees.

Typically, a service fee is added to price quotes for tree services. Such a fee is typically a straight per-quote fee. For example $65.00 service fee is typically added to all tree quotes.

Occasionally, a tree service company may need to charge an extra fee or percentage for non-typical items, such as permits, licenses or in some instances legal fees (i.e. getting court approval to remove a tree in a wetland or other protected areas). An allotment for such adjustments is considered and can be added to the Final Cost.

In some instances, a company may offer a set discount or percentage discount (i.e. 10% Senior Citizen or $50 off any job $500 or more). An allotment for such adjustments is considered and can be subtracted from the Final Cost.

The present invention allows for adjustment of Final Cost to match the differences in local pricing based on the United States Department of Labor statistics for tree trimmers and arborist.

The present invention contemplates carrying out the above-listed calculations using a calculation means, such as a software program (for example a tree services price calculator program). In one embodiment, the software has user interface where pertinent input questions are asked in English. In an embodiment, the input from the user interface screen is imported into a calculator means, wherein the calculator means uses the imported input to carry out the above-listed steps, such steps being at the very least the Trunk Mass and Adjusted Canopy Mass calculations, and preferably having the other factors being affirmatively considered, even if they have a default adjustment resulting in no change of the Final Cost other than that resulting from the Adjusted Canopy Mass (i.e. the Base Cost is the Final Cost).

The invention contemplates providing access to the calculator as software installed on a computer, or downloadable, or resident on another computer or internet host, where data is input by any of the conventional means by the end-user.

The present invention further contemplates the gathering of data for use in the tree services price calculator of the present invention by using photographs of the damage. Typically for such calculations, a photograph of the damage includes a measurement guide, such as a yardstick in the photo near the tree, that can be used to derive the estimates.

Also contemplated is the use of digital photography of the tree or limbs to be removed, from which the data is obtained and may be exported into the tree services calculator. For example, tree trunk volumes (trunk mass), canopy shape and other parameters for determining canopy volume (canopy mass), and canopy density can be determined from photographs.

What is claimed is:

1. A computer implemented method for determining a price for tree services comprising the steps of a computer:
   a. receiving a tree service price request wherein said tree service price request includes data to calculate trunk mass, adjusted canopy mass, difficulty factor data, disposal data, rental data, limb measurement data, pile volume data, and pile compression data;
   b. calculating an adjusted base cost using the trunk mass data, adjusted canopy mass data, limb measurement data, pile volume data, pile compression data, canopy density factors, cost per trunk mass unit, cost per canopy mass unit, vegetation factor, and pile compression factor;
   c. calculating a cumulative difficulty factor using the difficulty factor data, accessibility factors, obstacle factors, health factors, hazard factors, growth factors, weather factors, terrain factors, disaster factors, and felling cost factors;
   d. calculating a final cost for tree services using the adjusted base cost, the cumulative difficulty factor, disposal data, and rental data; and
   e. outputting the final cost for tree services for the tree service price request.

2. The method for determining a price for tree services according to claim 1 wherein said difficulty factor data includes data accessibility, obstacles, health, hazard, growth, weather, terrain, disaster, or felling cost.

3. The method for determining a price for tree services according to claim 1 wherein said tree service price request is for a downed tree.

4. The method for determining a price for tree services according to claim 3 wherein said downed tree is a whole or half tree and the adjusted base cost is the adjusted canopy mass times the canopy cost per unit volume plus the trunk mass times the trunk cost per unit volume.

5. The method for determining a price for tree services according to claim 4 wherein said adjusted canopy mass is the canopy mass times the canopy density factor.

6. The method for determining a price for tree services according to claim 3 wherein said downed tree is a limb or debris and the limb formula of limb length times limb width times the vegetation factor times the removal cost for unit limbs or debris gives the adjusted base cost for limbs, and the pile formula of pile volume times pile compression factor times the removal cost for unit limbs or debris gives the adjusted base cost for debris.

7. An apparatus for determining a price for tree services comprising:
   a. a data receiving means for receiving a tree service price request wherein said tree service price request includes trunk mass data, adjusted canopy mass data, difficulty factor data, disposal data, rental data, limb measurement data, pile volume data, and pile compression data;
   b. a database storage means for storing at least one of the canopy density factors, cost per trunk mass unit, cost per canopy mass unit, accessibility factors, obstacle factors, health factors, hazard factors, growth factors, weather factors, terrain factors, disaster factors, felling cost factors, disposal factors, rental factors, vegetation factor, and pile compression factor;
   c. an adjusted base cost calculating means for calculating the adjusted base cost from the trunk mass data, adjusted canopy mass data, limb measurement data, pile volume data, pile compression data, canopy density factors, cost per trunk mass unit, cost per canopy mass unit, vegetation factor, and pile compression factor;
   d. a cumulative difficulty factor calculating means for calculating the cumulative difficulty factor from the difficulty factor data, the accessibility factors, obstacle factors, health factors, hazard factors, growth factors, weather factors, terrain factors, disaster factors, and felling cost factors;
   e. a final cost calculating means for calculating the final cost from the calculated adjusted base cost, the calculated cumulative difficulty factor, disposal data, disposal cost factors, rental data, and rental factors; and
   f. a tree service price output means for outputting the tree service final cost for tree services determined from the tree service price request.

8. The apparatus for determining a price for tree services according to claim 7 wherein said difficulty factor data included data accessibility, obstacles, health, hazard, growth, weather, terrain, disaster, or felling cost.

9. The apparatus for determining a price for tree services according to claim 7 wherein said tree service price request is for a downed tree.

10. The apparatus for determining a price for tree services according to claim 9 wherein said downed tree is a whole or half tree and the adjusted base cost is the adjusted canopy mass times the canopy cost per unit volume plus the trunk mass times the trunk cost per unit volume.

11. The apparatus for determining a price for tree services according to claim 10 wherein said adjusted canopy mass is the canopy mass times the canopy density factor.

12. The apparatus for determining a price for tree services according to claim 9 wherein said downed tree is a limb or debris and the limb formula of limb length times limb width times the vegetation factor times the removal cost for unit limbs or debris gives the adjusted base cost for limbs, and the pile formula of pile volume times pile compression factor times the removal cost for unit limbs or debris gives the adjusted base cost for debris.

13. A computer system for determining a price for tree services comprising:
   a. a tree service price request input source for receiving a request for a price on tree services, the request comprising input data for at least one of height of tree trunk, radial measurement of the tree trunk, canopy mass and canopy density, difficulty factor data, disposal data, rental data, limb measurement data, pile volume data, and pile compression data;
   b. a tree service factor database comprising at least one of canopy density factors, cost per trunk mass unit, cost per canopy mass unit, accessibility factors, obstacle factors, health factors, hazard factors, growth factors, weather factors, terrain factors, disaster factors, felling cost factors, disposal factors, rental factors, vegetation factor, and pile compression factor;

c. a tree service price processor coupled to the tree service price request input source and the tree service factor database, said processor comprising means for calculating adjusted base cost using said height of tree trunk, radial measurement of the tree trunk, canopy mass and canopy density, limb measurement data, pile volume data, and pile compression data, canopy density factors, cost per trunk mass unit, cost per canopy mass unit, vegetation factor, and pile compression factor: means for calculating cumulative difficulty factor using said difficulty factor data, accessibility factors, obstacle factors, health factors, hazard factors, growth factors, weather factors, terrain factors, disaster factors, and felling cost factors; and means for calculating final cost using the adjusted base cost, the cumulative difficulty factor, disposal data, disposal factors, rental data, and rental factors to provide output data to make a serviced tree service price request; and d. a tree service price output source, coupled to the tree service price processor, for outputting the serviced tree service price request.

14. The system for determining a price for tree services according to claim 13 wherein said difficulty factor data included data accessibility, obstacles, health, hazard, growth, weather, terrain, disaster, or felling cost.

15. The system for determining a price for tree services according to claim 13 wherein said tree service price request is for a downed tree.

16. The system for determining a price for tree services according to claim 15 wherein said downed tree is a whole or half tree and the adjusted base cost is the adjusted canopy mass times the canopy cost per unit volume plus the trunk mass times the trunk cost per unit volume.

17. The system for determining a price for tree services according to claim 16 wherein said adjusted canopy mass is the canopy mass times the canopy density factor.

18. The system for determining a price for tree services according to claim 15 wherein said downed tree is a limb or debris and the limb formula of limb length times limb width times the vegetation factor times the removal cost for unit limbs or debris gives the adjusted base cost for limbs, and the pile formula of pile volume times pile compression factor times the removal cost for unit limbs or debris gives the adjusted base cost for debris.

\* \* \* \* \*